Jan. 11, 1966 B. M. SOSIN 3,229,232

VESTIGIAL SIDEBAND MODULATION SYSTEM

Filed Feb. 14, 1963

INVENTOR
Boleslaw Marian Sosin
BY
Baldwin & Wight
ATTORNEYS

United States Patent Office 3,229,232

Patented Jan. 11, 1966

3,229,232
VESTIGIAL SIDEBAND MODULATION SYSTEM

Boleslaw Marian Sosin, Great Baddow, Essex, England, assignor to The Marconi Company Limited, a British company Filed Feb. 14, 1963, Ser. No. 258,471
Claims priority, application Great Britain, Apr. 10, 1962, 13,780/62
5 Claims. (Cl. 332—45)

Figures 1, 2:
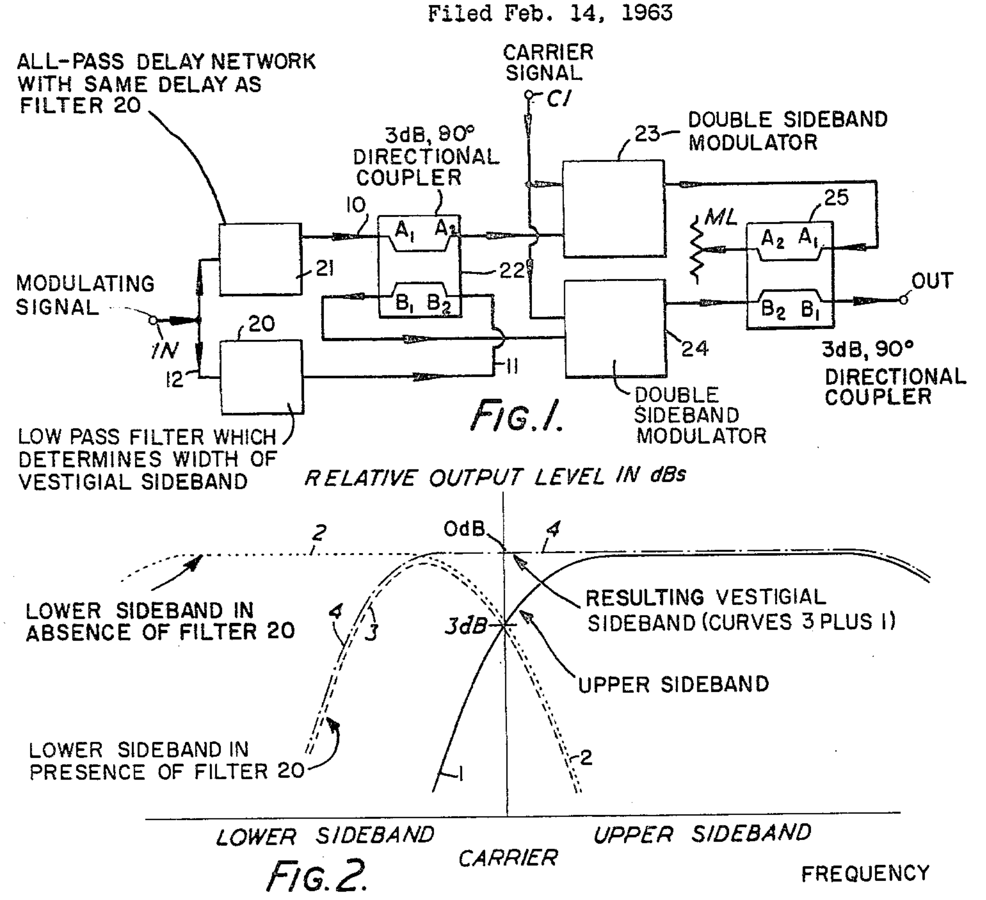

This invention relates to carrier wave modulation systems and more specifically to so-called vestigial sideband modulation systems suitable for use in television and other ultra high frequency (U.H.F.) and very high frequency (V.H.F.) transmitters. The invention seeks to provide improved vestigial sideband modulation systems suitable for use for such purposes which shall not involve the use of large or expensive U.H.F. or V.H.F. vestigial sideband filters, which shall be simple, and which shall be such as to enable a required amount of vestigial sideband to be readily chosen at will.

The method at present most commonly adopted for obtaining vestigial sideband modulation in a television transmitter consists in effecting double sideband modulation of a carrier and employing a vestigial sideband filter. This method has, however, the serious practical defect that, because of the high powers and frequencies involved, such filters are large and expensive.

It is known (see Gouriet and Newell on "A Quadrature Network for Generating Vestigial Sideband Signals" in the Proceedings of the Institution of Electrical Engineers, vol. 107, part B, 1960, at page 253) to produce a single sideband modulation by quadrature modulation. This modulation system, though proposed for communication purposes, is seldom used in practice because it has the defect that it is very difficult to obtain that high degree of rejection of the unwanted sideband which is normally required in communication systems. Moreover the system is unsuited to television and similar transmitters where only about −20 db of rejection is required because it will not produce a vestigial sideband as required in a normal television specification.

According to the preferred feature of this invention a vestigial sideband modulation system comprises two double sideband modulators, means for applying carrier input to said modulators in phase or phase opposition, means for applying modulating input signals from a common source in phase or phase opposition to the two input terminals of a divider having two input terminals and two output terminals and adapted to provide, from the in-phase or phase opposed modulating signals applied to its two input terminals, the two modulating signals at each output terminal in phase quadrature with each other, corresponding modulating signals on the two output terminals also being in phase quadrature, means for applying the quadrature outputs from said divider, one to one modulator and the other to the other modulator, low pass filtering means in at least one of the modulating signal channels leading to said divider, and means for combining the outputs from said modulators in quadrature.

According to another feature of this invention a vestigial sideband modulation system comprises two double sideband modulators, means for applying carrier input to said modulators in quadrature, means for applying modulating input signals from a common source in phase or phase opposition to the two input terminals of a divider having two input terminals and two output terminals and adapted to provide, from the in-phase or phase opposed modulating signals applied to its two input terminals, the two modulating signals at each output terminal in phase quadrature with each other, corresponding modulating signals on the two output terminals also being in phase quadrature, means for applying the quadrature outputs from said divider, one to one modulator and the other to the other modulator, low pass filtering means in at least one of the modulating signal channels leading to said divider, and means for combining the outputs from said modulators in phase or phase opposition.

Preferably the divider is a directional coupler and the modulators are fed from the two outputs of said coupler, one input of the coupler being fed from the modulating source through a low pass filter and the other input of the coupler being fed from said source through a delay network substantially balancing the phase shift introduced by the low pass filter. In order to keep the physical dimensions of the directional coupler small, a coupler of the coupled artificial line type should be employed.

In embodiments of the invention in which the outputs of the modulators are combined in quadrature, the combination is preferably effected by a high frequency directional coupler having one input fed from one modulator and the other input fed from the other modulator, one of the outputs from said coupler providing the combined output of the whole system and the other of said outputs from said coupler feeding a matching load.

Figure 3:
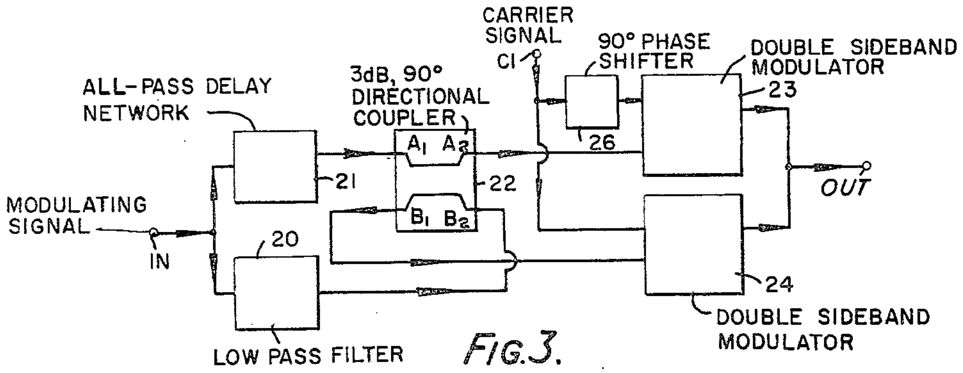

The invention is illustrated in and further explained in connection with the accompanying drawings in which FIGURES 1 and 3 are block diagrams of two embodiments of the invention, that of FIGURE 1 being preferred; and FIGURE 2 is an explanatory graphical figure. Like references denote like parts in FIGURES 1 and 3.

Referring to FIGURE 1 which shows a vestigial sideband modulation system for a television transmitter, video signals at a modulating signal input terminal IN divide into two channels, one of which contains a linear phase low pass filter 20 and the other of which contains an all-pass delay network 21 providing a phase shift equal to and balancing that due to the filter 20. The filter and the delay network feed respectively into the two inputs of a divider comprising a video directional coupler 22 of the coupled artificial line type. Such directional couplers are well known in the art, and are fully described in the article "Coupled Transmission Lines As Symmetrical Directional Couplers" by G. D. Monteath in the Proceedings of the Institution of Electrical Engineers, vol. 102, part B, May 1955, at pages 383–392. As is explained in the Monteath publication, the symmetrical directional coupler 22 will comprise two similar unbalanced transmission lines coupled together by sharing a common outer conductor for part of their length, so as to form a 3-conductor line. FIGURES 2*c*, 4, and 6 of the aforesaid article show the structural details of the coupler, and FIGURE 1 symbolically indicates its action.

The directional coupler 22 has input terminals designated $A_1$ and $B_2$, and output terminals designated $A_2$ and $B_1$. One of the properties of the coupler, pointed out by Monteath, is that the outputs at $A_2$ and $B_1$ are in phase quadrature. Moreover, considering a signal input applied to $A_1$, a part of this signal passes straight through the coupler from $A_1$ to $A_2$, but a portion thereof is diverted along paths of reflection to $B_1$. Similarly a signal input to $B_2$ produces a signal output at $B_1$ and another signal output at $A_2$. Therefore the modulating signal input which is fed to terminal $A_1$ in applicant's FIGURE 1 gives rise to a modulating signal output at each of the output terminals $A_2$ and $B_1$, while the other modulating signal input at $B_2$ also produces modulating signal outputs at both output terminals. The result is that two modulating signals will be present at each output terminal, those at $A_2$ being in phase quadrature with each other and those at $B_1$ being in phase quadrature with each other. It will be seen that corresponding modulating signals on the two output terminals, i.e. the modulating signal outputs which have been derived from the same signal input, are also in phase quadrature.

One output from the coupler 22 is fed as one modulating input to one double sideband modulator 23 and the other coupler output supplies modulating input to a second similar double sideband modulator 24. Carrier input is supplied to the two modulators from an input terminal C1 either in-phase, as indicated in FIGURE 1, or in phase opposition. Because of the phase shift introduced in the coupler 22 as discussed above, the modulating inputs to the two modulators will be in phase quadrature. The outputs from the two modulators 23 and 24 are fed respectively to the two inputs of a directional coupler 25 of the coupled line type and which is preferably also of the same general nature as coupler 22. One output of the coupler 25 is connected to a matching load conventionally represented at ML and which may be adjustable, while the other output is connected to a final output terminal OUT. Because of the phase shift introduced in the coupler 25 the outputs from the modulators will be combined in quadrature to produce a combined final output at OUT.

The operation of the system will be best understood from the graphs of FIGURE 2 which show output levels due to inputs at different parts of the system. Referring to FIGURE 2, the full line curve 1 represents the output response due solely to video signal input at the lead 10 leading to one input of the coupler 22 and the dotted line curve 2 similarly represents the output response due solely to video input at the lead 11 leading to the other input of the coupler 22. Curves 1 and 2 are mirror images of one another. In other words, elements 22, 23, 24 and 25 considered together and with a modulating signal input to terminal $A_1$ only (lead 11 open-circuited) in effect form a single sideband system employing phase cancellation, equivalent to that described for instance in Electronic and Radio Engineering, F. E. Terman, 4th edition, McGraw-Hill Book Company, Inc., 1955, at pages 541 and 542 or in The Radio Engineering Handbook, K. Henney, 3rd edition, McGraw-Hill Book Co., Inc., 1941, pages 552 and 553. It will be seen that, since the two modulating signal outputs from directional coupler 22 due to the input at $A_1$ are in phase quadrature, the output of modulator 23 may be designated as "reference phase" sidebands symmetrically spaced about the carrier frequency. At the same time, the output of modulator 24 contains sidebands of identical frequencies and magnitudes but of such relative phase that the vector addition of the resultants of modulation which takes place in the combining directional coupler 25 causes cancellation of one set of sidebands and reinforcement of the other set of sidebands, the resulting output being the curve 1 shown in applicant's FIGURE 2. Curve 2 would be produced in the same way, were it not for the presence of the low pass filter 20, the effect of which will be described below. Briefly stated, then, an output signal produced by a modulating signal on lead 10 is in phase quadrature with the output signal produced by a modulating signal on lead 11 and therefore simultaneous application of modulation on leads 10 and 11 would, in the absence of low pass filter 20, produce a complete double sideband modulation.

Consider now the effect of the low pass filter 20 which determines the width of the vestigial sideband produced, and imagine the modulation to be applied only at lead 12 leading to the filter. The output response is then as shown by the broken line curve 3 of FIGURE 2. If the modulation is fed in through both the low pass filter 20 and the delay network 21 so that the phase delay introduced by the filter is balanced by the network 21 then the output response obtained with the signals applied at IN is as shown by the chain line 4 of FIGURE 2. This is a vestigial sideband response. The amount of vestigial sideband obtained is readily selectable by suitably choosing the design of the filter 20.

This modulation system has the following major advantages:

(a) The elements 20, 21, and 22 are all simple and relatively inexpensive.

(b) There is no dependence for operation on large and expensive U.H.F. or V.H.F. filtering.

(c) The amount of vestigial sideband can be chosen at will at any desired value.

(d) Change of carrier frequency does not involve change of filters, and (e) Any reflected signals coming back to the output terminal OUT and caused, for example, by an impedance mismatch in the output circuit, will be absorbed and not give rise to re-reflection into the output circuit again.

The illustrated arrangement of FIGURE 1 will give upper sideband operation. If the positions of the elements 20 and 21 are interchanged lower sideband operation will result. Obviously in practice video amplifiers and attenuators may be required in different parts of the network and may be introduced as necessary or convenient. They are not shown in order to avoid complication of the drawings.

FIGURE 3 shows a possible modification which is, however, not preferred. The difference between FIGURES 1 and 3 lies in the fact that in the latter figure the carrier inputs to the two modulators are in quadrature instead of being in phase or phase opposition and quadrature but in phase or phase opposition. The quadrature relationship between the carrier inputs to the modulators is obtained by inserting a 90° phase shifter 26 in the channel to one of them, and in FIGURE 3, in-phase combination of the modulator outputs is obtained by simple parallel connection. Obviously the phase opposition combination could be obtained by employing push-pull connection. The arrangement of FIGURE 3 is not preferred because it does not produce advantage (e) above mentioned as obtained with the embodiment of FIGURE 1, i.e. immunity against so-called "ghost" signals due to the re-reflection into the output circuit of signals reflected back therefrom is not obtained.

I claim:

1. A vestigial sideband modulation system comprising two double sideband modulators; means for applying carrier input to said modulators; a divider having two input terminals and two output terminals and providing from two modulating signals applied one to one input terminal and the other to the other input terminal with a phase relation of $n\pi$, where $n$ is any integer including zero, the two modulating signals at each output terminal in phase quadrature with each other, corresponding modulating signals on said two output terminals also being in phase quadrature; means for applying two modulating signals to the two input terminals of the divider; means for applying the resulting two outputs from the divider, one to one modulator and the other to the other modulator; low pass filtering means in one of the modulating signal channels leading to said divider; and means for combining the outputs from said modulators in quadrature phase relationship.

2. A system as claimed in claim 1 wherein the divider is a directional coupler and the modulators are fed from the two outputs of said coupler, one input of which coupler is fed from the modulating source through a low pass filter and the other input of which coupler is fed from said source through an all-pass delay network substantially balancing the phase shift introduced by the low pass filter.

3. A vestigial sideband modulation system comprising two double sideband modulators; means for applying carrier input to said modulators in quadrature phase relationship; a divider having two input terminals and two output terminals and providing from two modulating signals applied one to one input terminal and the other to the other input terminal with a phase relation of $n\pi$, where $n$ is any interger including zero, the two modulating signals at each output terminal in phase quadrature with each other, corresponding modulating signals on said two output terminals also being in phase quadrature; means for applying two modulating signals to the two input terminals of the divided; means for applying the resulting two outputs from the divider, one to one modulator and the other to the other modulator; low pass filtering means in one of the modulating signal channels leading to said divided; and means for combining the outputs from said modulators with a phase relation of $n\pi$, where $n$ is an integer including zero.

4. A vestigial sideband modulation system comprising two double sideband modulators; means for applying carrier input to said modulators with a phase relation of $n\pi$, where $n$ is an integer including zero, a divider having two input terminals and two output terminals; means for applying two modulating input signals whose phase relation is $n\pi$ where $n$ is any integer including zero, one to one input terminal and the other to the other input terminal of the divider; said divider providing at each output terminal the two modulating signals in phase quadrature with each other, corresponding modulating signals on the two output terminals also being in phase quadrature; means for applying the resulting two outputs from the divider, one to one modulator and the other to the other modulator; low pass filtering means in one of the modulating signal channels leading to said divided; and means for combining the outputs from said modulators in quadrature phase relationship.

5. A vestigial sideband modulation system comprising two double sideband modulators; means for applying carrier input to said modulators in quadrature phase relationship; a divider having two input terminals and two output terminals; means for applying two modulating input signals whose phase relation is $n\pi$ where $n$ is any integer including zero, one to one input terminal and the other to the other input terminal of the divider; said divider providing at each output terminal the two modulating signals in phase quadrature with each other, corresponding modulating signals on the two output terminals also being in phase quadrature; means for applying the resulting two outputs from the divider, one to one modulator and the other to the other modulator; low pass filtering means in one of the modulating signal channels leading to said divider; and means for combining the outputs from said modulators with a phase relation of $n\pi$, where $n$ is any integer including zero.

References Cited by the Examiner

UNITED STATES PATENTS 2,173,145 9/1939 Wirkler ____________ 332—45 X

FOREIGN PATENTS 907,122 10/1962 Great Britain.

OTHER REFERENCES

The Phase Shift Method of Single Sideband Generation. Donald Norgaard, Pro. I.R.E. vol. 44, 1956, pages 1718–1735.

HERMAN KARL SAALBACH, *Primary Examiner.*

ALFRED L. BRODY, *Examiner.*

ROY LAKE, P. L. GENSLER, *Assistant Examiners.*